United States Patent [19]

Winbow et al.

[11] Patent Number: 5,268,537
[45] Date of Patent: Dec. 7, 1993

[54] BROADBAND RESONANT WAVE DOWNHOLE SEISMIC SOURCE

[75] Inventors: Graham A. Winbow, Houston; Jacob E. Stone, Bellaire, both of Tex.

[73] Assignee: Exxon Production Research Company, Houston, Tex.

[21] Appl. No.: 906,069

[22] Filed: Jun. 29, 1992

[51] Int. Cl.⁵ .................................. G01V 1/40
[52] U.S. Cl. .................................. 181/106; 367/911; 367/912; 181/102
[58] Field of Search .................. 367/911, 912; 181/102–106, 113

[56] References Cited

U.S. PATENT DOCUMENTS

| | | | |
|---|---|---|---|
| 2,102,668 | 12/1937 | Ballantine | 179/110 |
| 2,281,751 | 5/1942 | Cloud | 181/0.5 |
| 2,832,843 | 4/1958 | Miessner | 179/115.5 |
| 2,880,404 | 3/1959 | Harris | 340/11 |
| 3,019,660 | 2/1962 | Welkowitz | 74/1 |
| 3,243,766 | 3/1966 | Walther | 340/8 |
| 3,403,271 | 9/1968 | Lobdell et al. | 310/8.2 |
| 3,449,712 | 6/1969 | Angeloff | 340/8 |
| 3,730,269 | 5/1973 | Galle | 166/177 |
| 4,302,826 | 11/1981 | Kent et al. | 367/82 |
| 4,671,379 | 6/1987 | Kennedy et al. | 181/106 |
| 4,685,091 | 8/1987 | Chung et al. | 367/31 |
| 4,834,210 | 5/1989 | Kennedy | 181/106 |
| 4,855,964 | 8/1989 | Fanning et al. | 367/159 |
| 4,869,338 | 9/1989 | Wiggins et al. | 181/106 |
| 4,887,247 | 12/1989 | Black et al. | 367/151 |
| 4,960,181 | 10/1990 | Marin et al. | 181/106 |
| 4,993,001 | 2/1991 | Winbow et al. | 181/106 X |

Primary Examiner—J. Woodrow Eldred
Attorney, Agent, or Firm—Keith A. Bell; Darcell Walker

[57] ABSTRACT

Method and apparatus for generating resonant broad band pressure waves in a fluid-filled wellbore for seismic exploration. In the preferred embodiment, a device is provided in a borehole; the device comprises a cylindrical choke body and a means at each end of the choke body for partially or completely blocking off the borehole and creating a fluid-filled borehole cavity. The fluid inside the cavity is oscillated to establish a standing pressure wave of a desired bandwidth in the fluid. The standing wave is radiated through the wellbore into the earth formation and is received by seismic detectors. The fluid is oscillated over a range of frequencies to generate more information about the earth formation.

12 Claims, 6 Drawing Sheets

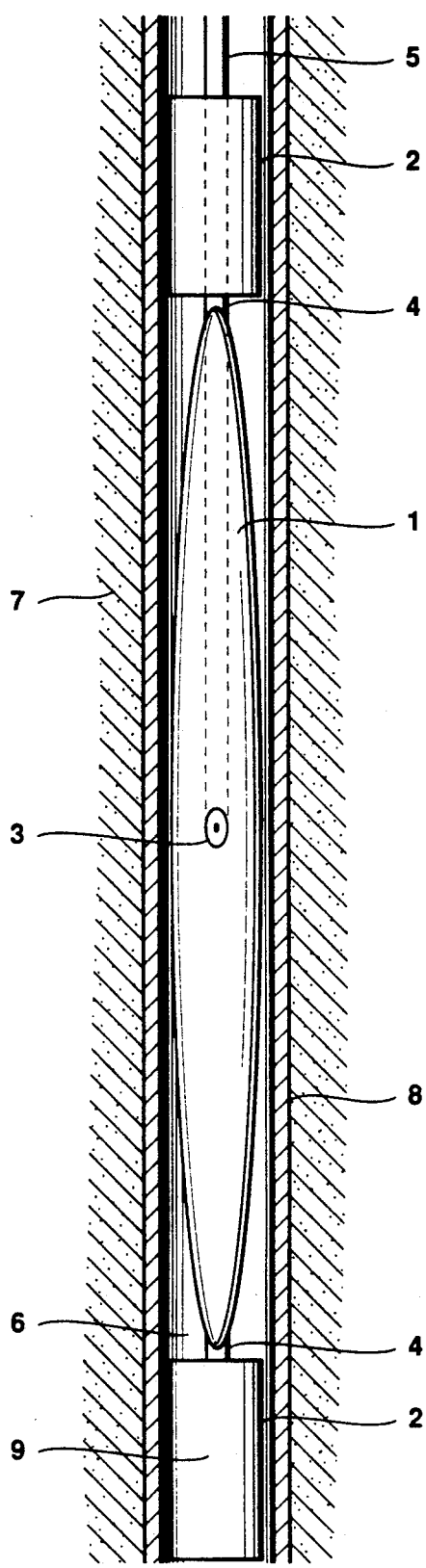 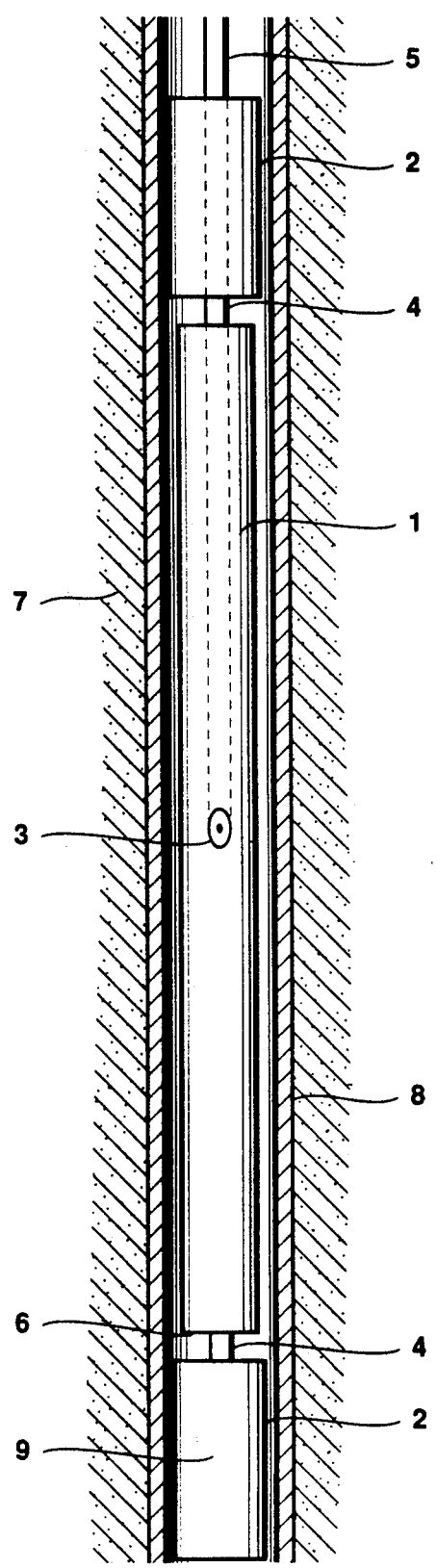
*FIG. 2*  *FIG. 2A*

BROADBAND RESONANT WAVE DOWNHOLE SEISMIC SOURCE

FIELD OF THE INVENTION

This invention relates to the generation of seismic waves for use in seismic exploration of the earth surrounding a wellbore.

BACKGROUND OF THE INVENTION

During the exploration for oil, gas, and other mineral deposits in the subsurface of the earth, seismic waves are used to map subsurface geologic structures and stratigraphic features. Sources, such as explosive charges, surface vibrators, and other energy sources operated on the surface, are used to create seismic waves in the earth. Most land seismic exploration is conducted by locating an array of sensors, called geophones, on the surface of the earth. The geophones detect waves generated by the sources and reflected back from geological structures in the subsurface. The signals are recorded and processed in various ways to yield information about the subsurface of the earth.

During various types of seismic exploration, such as reverse vertical seismic profiling and cross borehole imaging, sources are placed in a wellbore (borehole). The simplest downhole sources are explosive charges and airguns. However, these sources present several problems when generating seismic waves in a borehole. Although these sources can be used for crosshole imaging, they do not possess sufficient power for reversed vertical seismic profiling except in small scale applications. Another problem encountered when using conventional downhole sources is that they (especially explosives), may damage the cement bond or casing in the borehole. This potential to cause damage to the borehole causes a reduction in the amount of energy that can be supplied by the source. A third problem is that conventional downhole seismic sources, especially the airgun, typically expend a substantial fraction of their energy generating tube waves that travel up and down the borehole. This makes the sources less efficient than desired. This feature of creating mainly tube waves rather than radiant P-wave and S-wave energy is shared by most other downhole sources, including magnetostrictive and piezoelectric sources which may be useful for high resolution cross borehole work.

U.S. Pat. No. 4,671,379 to Kennedy, et al. illustrates a different kind of downhole seismic energy source. Energy is supplied downhole from the surface through coil tubing connected to a rotary valve located on the device downhole. A column of fluid in the wellbore is excited by the supplied energy to produce a resonant standing wave. This is accomplished by isolating the fluid between two gas bladders to form a column of fluid and exciting the fluid in the column into an oscillating motion with a driver that is in communication with the column of fluid. The fluid is oscillated at the resonant frequency of the column defined by the two gas bladders. During the operation of the invention, it is desirable to sweep the rotary valve through a range of resonant frequencies in order to gain more information about the subsurface of the earth. In order for this invention to perform a frequency sweep and maintain the resonant frequency of the fluid in the column, the length of the column must change for the various frequencies in the sweep. The device accomplishes this task by physically moving the gas bladders during the sweep. In order to maintain the column at $\frac{1}{2}$ wave resonance, the gas bladders are moved during an approximately 45 second sweep through a total distance of about 100 feet. The device must maintain resonance in order to operate effectively.

The source is intrinsically powerful (since its effective radiating length is tens of feet) and does not cause borehole damage. The patent states that the device provides a relatively efficient source of energy by operating at the resonant frequency of the column of fluid. However, several problems arise from this approach. First, mechanical movement downhole is necessary because the source must operate at the resonant frequency of the column and cannot vary the resonant frequency without changing the column length. The device must contain relatively complicated downhole equipment in order to vary the length of the column. A system requiring downhole moving parts such as this one is less reliable than desired. Repairs can only be effected by removing the system from the borehole leading to costly down time in operations. A second problem is with the duration of the sweep time of the device. As a sweep is made the length of the column varies. The distance each bladder must travel during a sweep is approximately 50 feet (based on a half wave length of a resonant standing pressure wave). Therefore, the sweep requires an extended time, approximately 45 seconds. It is not possible with this system to produce short sweeps of a few seconds each. Nor is it possible to operate with an impulsive source as the exciter.

The Kennedy et al. patent also describes an alternate embodiment that does not vary the length of the column. In this embodiment, inflatable sleeves surround the conduit between the end elements. These sleeves may be inflated with air causing a change in the apparent compressibility in the borehole fluid. The change in fluid properties changes the resonant frequency of the cavity. However, in this case also, the system can only execute relatively long sweeps and requires downhole moving parts leading to lower field reliability.

Therefore, there still remains the problem of providing a more powerful downhole source without the complication of moving parts and with increased reliability and flexibility of operation.

SUMMARY OF THE INVENTION

The present invention is a method and apparatus for generating a seismic wave in a borehole that radiates through a substantial length of the borehole. Since its length is extended, the source exerts little stress on the borehole wall as explained in G. A. Winbow (1991) Geophysics 56, 1055-1057 "Borehole Stresses Created by Downhole Seismic Sources." In this invention, a circular—cross-section elongated object (an elongated choke body) is placed in a fluid-filled borehole. The choke body closely fits the diameter of the borehole. Elements are placed at the upper and lower ends of the choke body, creating a cavity containing the choke body and borehole fluid. The fluid in the cavity is driven into oscillation to establish a seismic wave. Unlike U.S. Pat. No. 4,671,379, this invention does not require complicated downhole moving parts.

The borehole fluid may be driven by any convenient means. As an illustration, for reverse vertical seismic profiling (RVSP) a rotary valve-coil tubing system driving a rotary valve would be possible (as in U.S. Pat.

No. 4,671,379). For cross-hole work the source could be a piezoelectric, magnetostrictive or electromechanical device of designs well known in the art. In order for the radiation from the borehole to be broadband it is necessary to operate the source over a properly chosen frequency range. The central frequency may be selected as that where the acoustic resistance and reactance of the borehole wall are approximately equal.

Because of the presence of the elongated choke body and the preselected frequency range of operation, the generated wave is a broad resonance wave. This means that the invention not only radiates efficiently at the resonance peak frequency of the cavity, but also radiates efficiently over a broad range of frequencies around the resonance peak frequency. Therefore, one effect of this invention is to significantly broaden the resonant excitation spectrum of the cavity without changing the length of the cavity. Thus, oscillations of pressure on the borehole wall where the cylinder is located can be excited over a broad range of frequencies without changing the length of the cavity.

BRIEF DESCRIPTION OF THE DRAWINGS

FIG. 2 is a vertical axis section view through a first embodiment of the invention.

FIG. 2a is a vertical axis section through a second embodiment of the invention.

DESCRIPTION OF THE PREFERRED EMBODIMENTS

Figure 1:
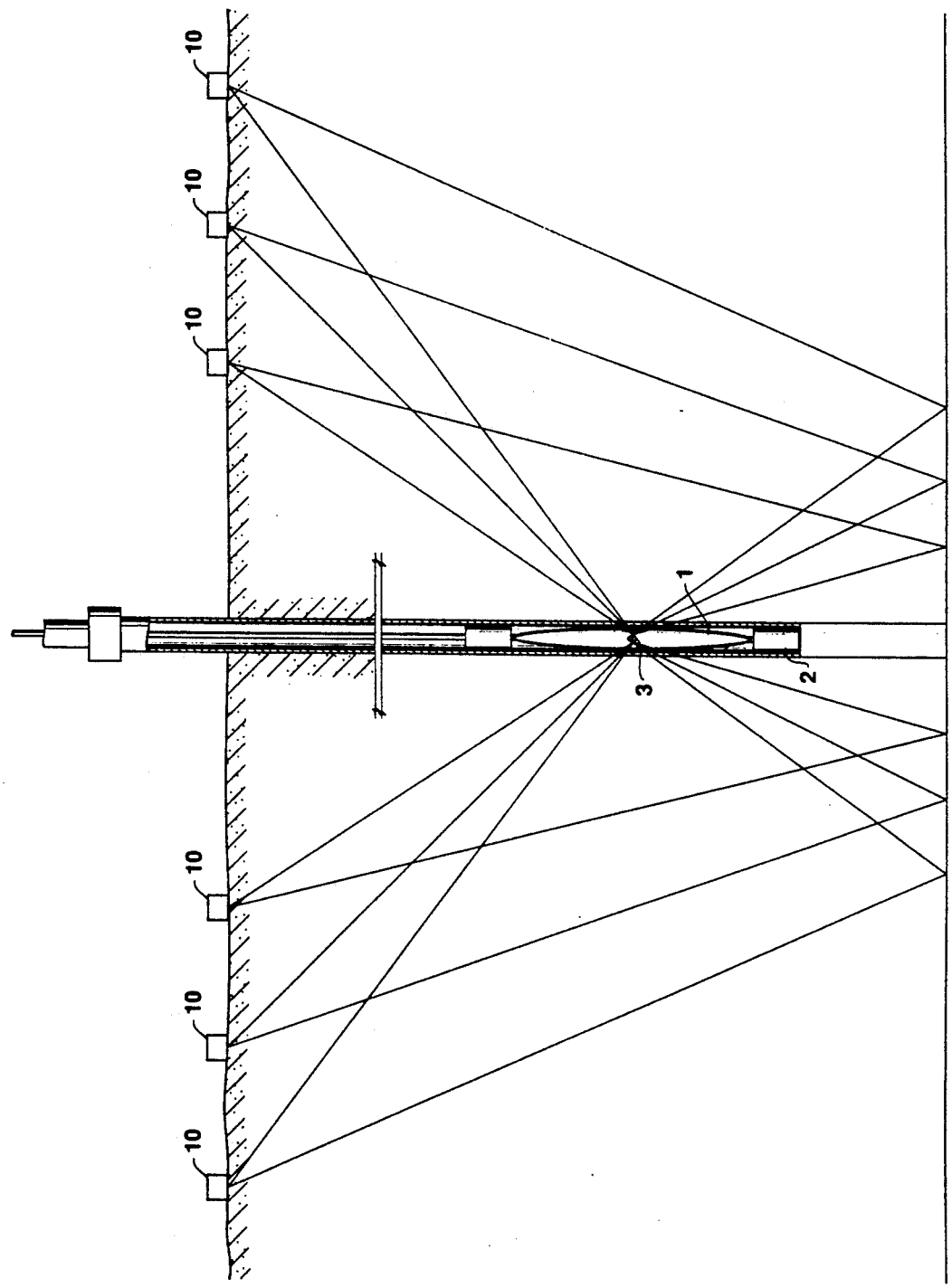
FIG. 1 is a schematic cross-section view of the invention used in the field.

An embodiment of the present invention provides a method and apparatus for generating seismic waves, from within a borehole, that radiate through a substantial portion of the borehole, while exerting little stress on the borehole wall as illustrated in FIG. 1. The system described herein sets up a resonant cavity capable of efficient radiation over a broad range of frequencies without any change in the size or structure of the cavity.

In FIG. 2, two cylindrical elements (barriers) 2 are placed apart from each other in a fluid filled borehole in the area of interest. These two elements create a cavity in the borehole between them and serve as barriers defining the length of the cavity. Preferably, the length of the cavity is one half the wavelength of the preselected resonant operating frequency. These barriers are typically hollow 9 to provide a better impedance mismatch with the borehole fluid. Between the two barriers is a borehole element 1 (elongated choke body) that is approximately azimuthally symmetrical around the borehole axis. Its center diameter is slightly less than the diameter of the borehole to provide a close fit. This element has a strong acoustic impedance contrast with the fluid in the borehole. Usually this element is made of a material with high acoustic impedance such as steel. This choke body is connected at its ends to the barriers 2 by any connecting means 4. A fluid 6 fills the borehole including space inside the cavity external to the choke body. A means used to oscillate the fluid (cavity exciter) 3 can be contained inside or can be attached to the elongated choke body. In addition, there can be dual or multiple oscillaters attached to or contained inside the elongated choke body. This oscillating means can be a rotary hydraulic valve for example, or other device such as a piezoelectric crystal, a magnetostrictive driver, an electromagnetic oscillator, or an electrohydraulic servo controlled valve. The cavity exciter 3 is connected to a power supply 5 that supplies energy to initiate the oscillatory motion of the borehole fluid. The energy is supplied to the cavity fluid by the exciter at any frequency or frequencies within the bandwidth of the resonance of the cavity. Preferably energy will be supplied initially at a low frequency $F_L$ within the resonant bandwidth, and subsequently the frequency will be increased over a period of time until it reaches a higher frequency $F_H$ within the resonant bandwidth. Alternatively, the energy may be supplied in the form of pulses of energy in which case the cavity will simultaneously radiate all frequencies within its bandwidth.

Figure FIG. 2a illustrates an alternate form of choke body which is a solid cylinder instead of a tapered cylinder. In order for the radiation emerging from the borehole to be broadband it is necessary to take into account the acoustic impedance of the borehole wall. This is defined to be $$Z = p/Vr \qquad (1)$$

where Z is the acoustic impedance, p is the pressure exerted on the wall and Vr is the radial velocity of the borehole wall. Equation (1) is evaluated in the $(\omega, k)$ domain where $\omega$ is the circular frequency of operation and k is the wavenumber parallel to the borehole axis.

Figure 4A:
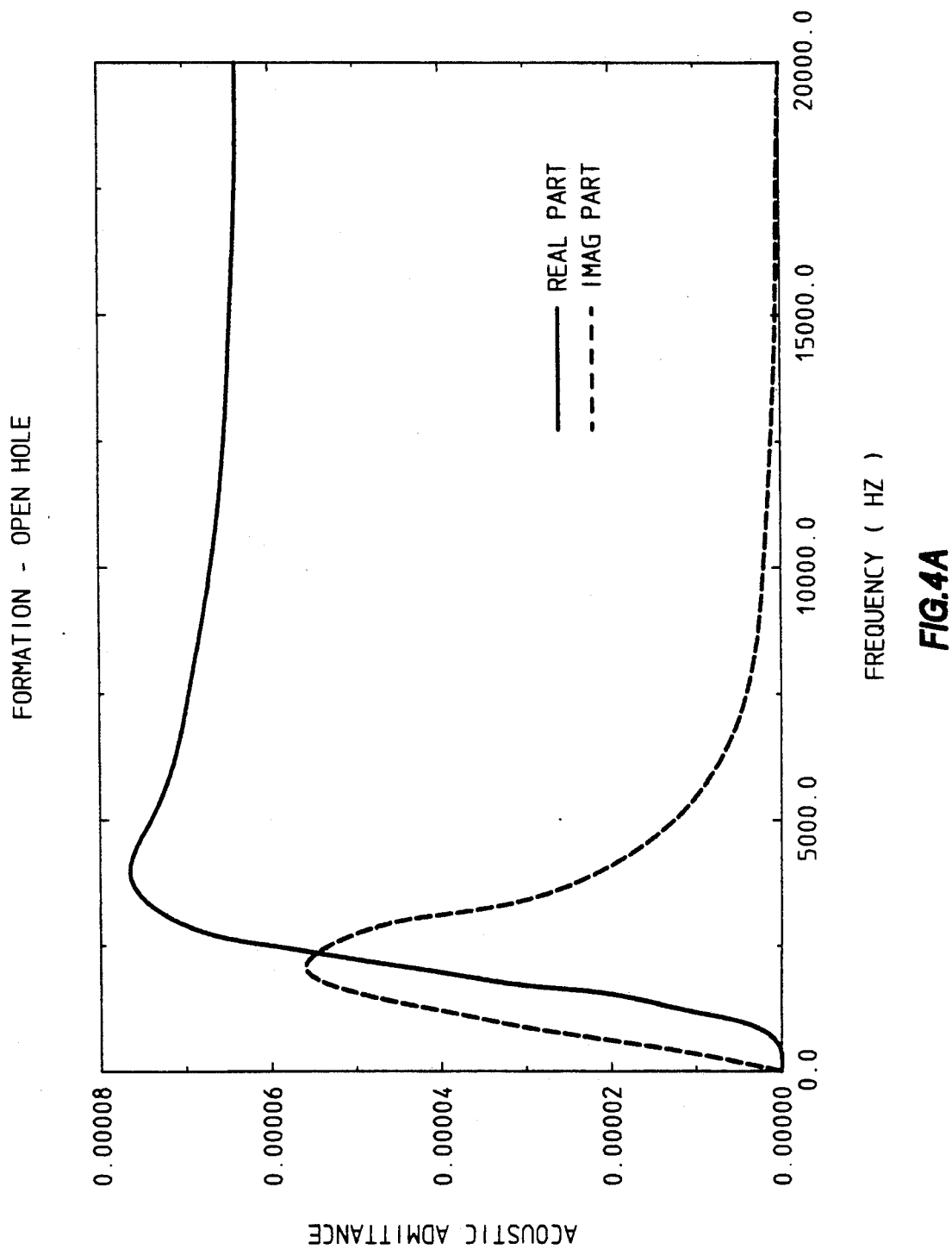
FIG. 4a is an illustration of the acoustic impedance of the borehole wall for an open borehole in a typical formation.
Figure 4B:
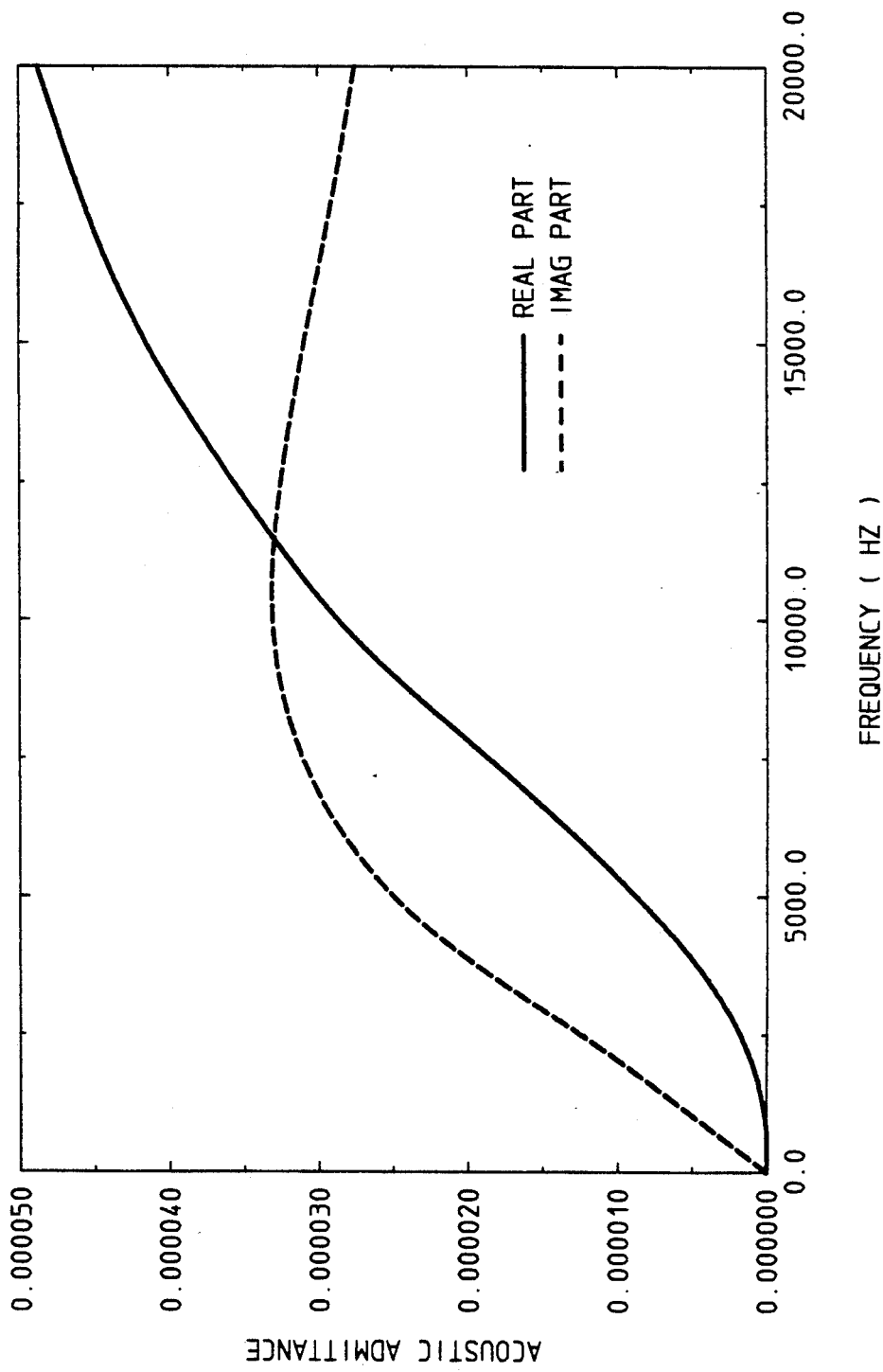
FIG. 4b is an illustration of the acoustic impedance of the borehole wall at the fluid-solid boundary for a cased borehole in a formation.

FIGS. 4a and 4b illustrate the acoustic admittance (as in electrical systems the acoustic admittance A is defined as the reciprocal of the acoustic impedance) for a variety of frequencies at $k=0$, for examples of open and cased boreholes in typical Gulf Coast materials. The acoustic impedance contains a real part (analogous to the resistance of an electric system) and an imaginary part (analogous to the reactance of an electrical system). For a discussion of the concepts of impedance and admittance see Morse and Feshbach: "Methods of Theoretical Physics, McGraw-Hill, N.Y. 1953, p. 310.

At seismic frequencies up to several hundreds of hertz, the acoustic admittance A is dominantly capacitative for either an open or a cased borehole. Therefore, little radiation can escape from the borehole. At high frequencies (comparable to 15 kHz) as used in sonic logging the admittance is predominantly resistive and radiation from the borehole is efficient. However, such frequencies are strongly attenuated in the earth media which limits the effective range of a source employing such frequencies.

The present design of this downhole source operates best at a central frequency approximately equal to the frequency at which the resistive and reactive parts of the admittance are equal. In an open borehole with a 6 inch diameter, the frequency is approximately 2.5 kHz for soft rocks (Vp=8000 ft./sec., Vs=4000 ft./sec.) and is approximately 5 kHz for harder rocks (Vp=16000 ft./sec., Vs=8000 ft./sec.). In an open borehole there is significant risk of sticking tools in the borehole, therefore, the choke body size should not exceed approximately 70% of the borehole diameter.

In a cased borehole, the choke body can be as large as 90–95% of the diameter of the borehole, since the risk of sticking tools in the well is much less than in an open hole. The effect of the choke body is to broaden the bandwidth ($\Gamma$) of radiation from the cavity. As given by J. D. Jackson: "Classical Electrodynamics", John Wiley & Sons, 2nd Edition, 1975, p. 357, the bandwidth of a resonant cavity is as follows:

$$\Gamma = \omega_o / Q \qquad (2)$$

where $\omega_o$ is the central operating circular frequency and Q is intrinsic to the design of the cavity and is defined as follows from Jackson 1975.

$$Q = \omega_0 \cdot \frac{\text{Stored Energy}}{\text{Power radiated}} \qquad (3)$$

The effect of the choke body is to reduce the volume of borehole fluid available to store energy and to leave the radiation unchanged. Thus the choke body acts to reduce the value of Q (from equation 3) and to increase $\Gamma$ (from equation 2).

In a cased borehole, the source operating frequency would be approximately 10 kHz without the choke body. With the choke body the source bandwidth may be expanded or alternatively the source's central frequency $\omega_o$ may be reduced and the bandwidth remain the same as in the absence of the choke body.

Since it is desirable to operate at frequencies as low as possible to increase the range of the source, inclusion of the choke body is important for operations in a cased borehole.

For most efficient operation, the length of the choke body should be approximately ¼ of a P-wave wavelength in the formation at the central operating frequency $\omega_o$.

Figure 3:
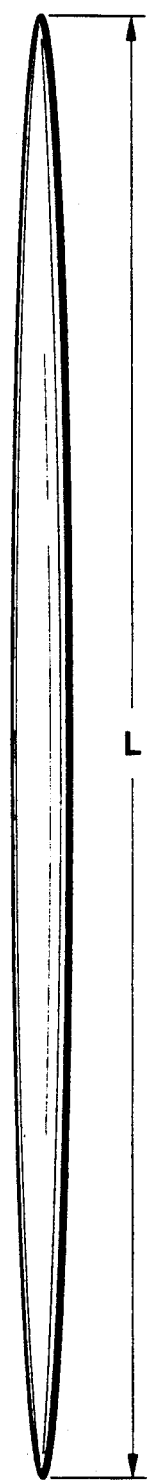
FIG. 3 is a side view of the elongated choke body.
Figure 5A:
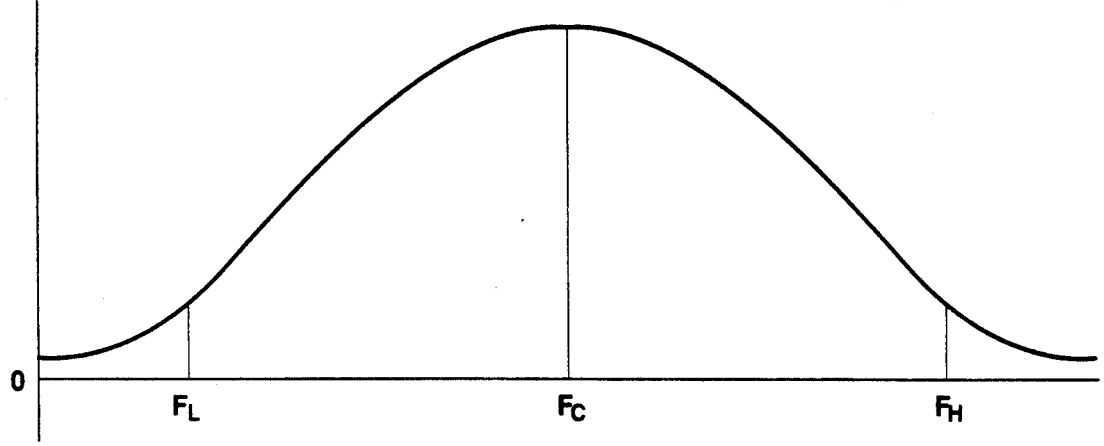
FIG. 5a is a display of the broadband signal spectrum generated by the invention.
Figure 5B:
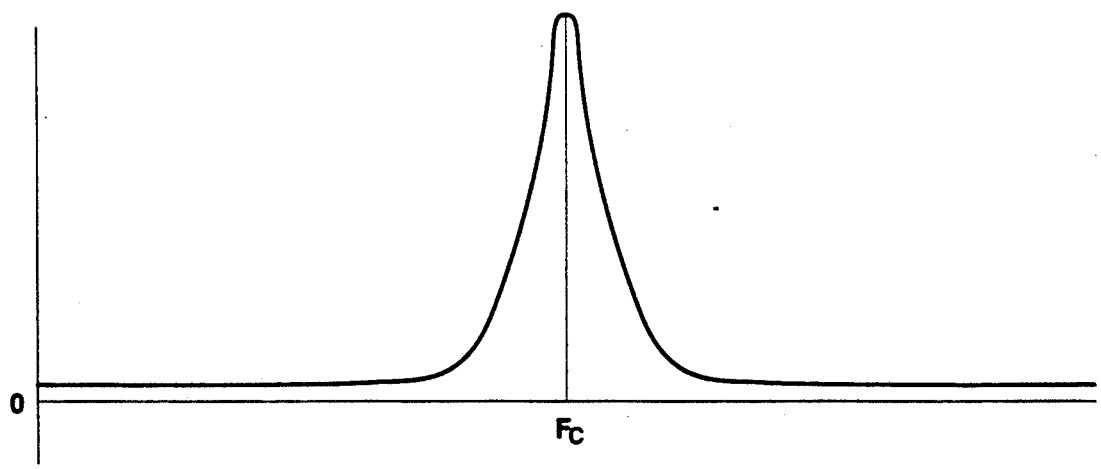
FIG. 5b is a display of the signal spectrum generated by the prior art.

The signal supplied to the earth formation 7 is illustrated as a function of frequency in FIG. 5a. This signal contains a broad band of frequencies surrounding the resonant frequency $f_C$ of the cavity. The prior art has a signal, FIG. 5b, that has a narrow band of frequencies surrounding the resonant frequency. FIG. 3 illustrates an embodiment of the invention that has a tapered choke body of length L.

The method and apparatus of this invention provides significant advantages over the prior art available. The invention has been described in connection with its preferred embodiments. However, it is not limited thereto. Changes and modifications to the basic design will be obvious to those skilled in the art or having the benefit of the foregoing teachings. All such changes and modifications are intended to be within the scope of the invention which is limited only by the following claims.

What is claimed is:

1. An apparatus for producing a seismic signal in a liquid filled wellbore for use in seismic exploration of the earth surrounding the wellbore, comprising:
   (a) means for defining a borehole cylinder having two end elements, a longitudinal axis extending between the end elements, and a fluid-flow path extending between the end elements, said end elements having a lower acoustic impedance than the liquid in the wellbore;
   (b) an elongated choke body means positioned in said borehole cylinder, adjacent each end element, to restrict the fluid-flow along the borehole cylinder axis, said means having a higher acoustic impedance than the liquid in the wellbore; and
   (c) means for exciting the liquid in said borehole cylinder into oscillation to produce a broadband resonant standing wave in said borehole cylinder.

2. The apparatus of claim 1 wherein the means positioned in said borehole cylinder comprises an elongated choke body having a generally circular cross section, a mid-section, a first end, a second end, and a longitudinal axis extending between the first end and the second end.

3. An apparatus as in claim 2 wherein the elongated choke body tapers from the midsection toward each of the first end and second end.

4. The apparatus of claim 1 wherein the length of the borehole cylinder is a length one half the wavelength of a preselected resonant frequency.

5. An apparatus for producing a seismic signal in a liquid filled wellbore for use in seismic exploration of the earth surrounding the wellbore, comprising:
   (a) an elongated choke body element with two ends, said element having a higher acoustic impedance than the liquid in the wellbore;
   (b) an end means positioned in said wellbore adjacent each of said ends of said elongated choke body element so as to define a borehole cylinder therebetween containing said elongated choke body element and a portion of said wellbore liquid, each of said end means having a lower acoustic impedance than said wellbore liquid;
   (c) means for connecting each of said end means to said elongated choke body element; and
   (d) means for exciting the liquid in said borehole cylinder into oscillation whereby said oscillation of said liquid produces a broadband resonant standing pressure wave in said borehole cylinder having a central frequency equal to or greater than the frequency at which the resistive and reactive parts of the acoustic admittance are approximately equal.

6. The apparatus of claim 5 wherein the elongated choke body element is tapered toward both said ends.

7. The apparatus of claim 6 wherein the length of the borehole cylinder is a length one-half the wavelength of a preselected broadband resonant frequency.

8. A method for downhole generation of seismic waves for use in seismic exploration of the earth surrounding a liquid filled wellbore having a wellbore diameter, said method comprising the steps of:
   (a) positioning an elongated choke body element having a center section and two ends, said element being tapered from said center section towards each of said ends and said center section closely fitting the wellbore diameter, said element having a higher acoustic impedance than the liquid in the wellbore;
   (b) positioning end means adjacent each of said ends of said elongated choke body element so as to define a borehole cylinder therebetween containing said elongated choke body element and a portion of said wellbore liquid, each of said end means having a lower acoustic impedance than said wellbore liquid;
   (c) creating an oscillating motion in the liquid in said borehole cylinder, said liquid being oscillated at a rate adequate to produce a broadband resonant standing pressure wave within said borehole cylinder.

9. The method of claim 8 further comprising the step of varying the oscillation frequency of the fluid over a range of frequencies.

10. The method of claim 8 wherein said fluid is excited impulsively.

11. The method of claim 8 further comprising the step of varying the oscillation frequency of the fluid over a range of frequencies.

12. The apparatus of claim 5 wherein said central frequency is at least 2,500 cycles per second.

* * * * *